United States Patent [19]
Harvey

[11] 3,748,033
[45] July 24, 1973

[54] DEVICE FOR LOCATING A FILM TRANSPARENCY

[75] Inventor: Donald M. Harvey, Rochester, N.Y.

[73] Assignee: Eastman Kodak Company, Rochester, N.Y.

[22] Filed: Apr. 22, 1971

[21] Appl. No.: 136,453

[52] U.S. Cl.............. 353/60, 271/74 FC, 271/59, 352/140, 352/222, 353/61, 353/69, 353/95, 353/101
[51] Int. Cl...... G03b 21/16, G03b 1/52, G03b 3/10
[58] Field of Search...................... 353/69, 101, 52, 353/60, 61, 95, 96; 352/140, 222; 271/74 FC, 59

[56] References Cited
UNITED STATES PATENTS
3,273,953  9/1966  Davee............................. 352/222

Primary Examiner—Louis R. Prince
Assistant Examiner—Steven L. Stephan
Attorney—W. H. J. Kline and Milton S. Sales

[57] ABSTRACT

A device for locating a film transparency along the light path of a projector having an optical axis includes a bracket for holding a transparency in the projector for movement along the optical axis from a reference plane intersecting the light path. Means are provided for directing a current of air against the one surface of the transparency to form a first region on that surface wherein the pressure exerted on the transparency is greater than atmospheric pressure and a second region wherein the pressure exerted on the transparency is less than atmospheric pressure. The opposite surface of the transparency is exposed to atmospheric pressure. The transparency will be moved by the pressure imbalance until the total pressure exerted on the one surface is equal to the atmospheric pressure exerted against the opposite surface.

9 Claims, 3 Drawing Figures

Patented July 24, 1973

DONALD M. HARVEY
INVENTOR.

BY *Milton S. Sales*

*W. H. J. Kline*

ATTORNEYS

Patented July 24, 1973

DONALD M. HARVEY
INVENTOR.

BY *Milton S. Sales*

*W. H. J. Kline*

ATTORNEYS

DEVICE FOR LOCATING A FILM TRANSPARENCY

BACKGROUND OF THE INVENTION

1. Field of the Invention

This invention relates generally to photographic projectors and more specifically to an improved method and device for automatically maintaining image focus in such projectors.

2. Description of the Prior Art

A major problem encountered in the field of slide projectors is the difficulty in maintaining sharp focus from slide to slide. One cause of loss of focus arises due to the fact that the frames in which transparencies are mounted tend to distort and are not always of uniform thickness. Therefore, if the frame is used to position the transparency carried thereby, variations in frame dimensions will cause a loss in focus sharpness. Loss of a sharp focus can also result from position variations between successive slides relative to the focal point of the projector lens or heat distortions ("popping") of the film itself. Such heat distortions are most likely to result from point-to-point variations in density along the film's image area and the resulting unequal absorption of heat by the film occurring because of these variations. This problem may be aggrevated by the point-to-point variation in the intensity of the projection radiation.

Various devices have been utilized in prior art slide projectors to solve the problem of automatically maintaining a sharp image focus. One such device for correcting positional variations involves detecting changes in film position by reflecting a narrow light beam from a small area of the film surface at near grazing incidence. A change in the position of this small surface area causes a deflection of the reflected light beam which is sensed by light-sensitive cells. By means of appropriate circuitry, mechanism is actuated to readjust the film plane itself or to shift the inner focal plane of the projection lens to compensate for the shift in the film plane. U. S. Pat. No. 3,037,423, which issued June 5, 1962 in the name of W. A. Shurcliff, discloses such a device.

Another technique for maintaining a sharp image focus involves directing a stream of air through a chamber formed, in part, by the film to be projected. Positional variations in the slide or distortions of the surface of the slide effect changes in air pressure in the apparatus. The changes in air pressure are used to control a pneumatic servomechanism or similar device which acts directly upon the film slide to cause movement of the slide in a direction to offset the position variation or the distortions in the film surface so that the image may be maintained at the point-of-best focus. Mechanisms employing this general concept are described in co-assigned U. S. Pats. No. 3,326,081 issued June 20, 1967 in the name of W. E. White and U.S. Pat. No. 3,402,638 issued Sept. 24, 1968 in the name of M. R. Hutchison.

SUMMARY OF THE INVENTION

One of the objects of the present invention is to provide an improved device for automatically positioning a film transparency in a projector.

Another object of this invention is to provide a device for automatically correcting changes in focus occurring during film projection due to distortions on the surface of the film.

Still another object of the invention is to provide an improved device for permitting automatic focusing in a slide projector system in which the mechanism is of simple design and construction and economical to manufacture.

In accordance with the above objects, the illustrated embodiment of the present invention provides, through an application of the Bernoulli Principle of fluid mechanics (i.e., that the pressure exerted by a fluid against a surface varies inversely with the velocity of the fluid across that surface), a novel and unobvious scheme for maintaining a film transparency at the point-of-best focus.

According to the invention described herein, a stream of air or other fluid is directed from a high pressure source through a passage bounded on one side by a film transparency and on the other side by a fixed reference member having a surface at varying distances from the surface of the transparency. In portions of the passage, the air pressure on the transparency exceeds atmospheric pressure and, due to the Bernoulli Principle, in other portions the air pressure on the transparency is less than atmospheric pressure. If the transparency is located at the point-of-best focus, the velocity of air moving through the passage will be effective to exert a total force on one surface of the transparency equal to the force exerted on the other side of the transparency by atmospheric pressure, and the transparency will remain at the point-of-best focus. If the transparency is not located at the point-of-best focus, the volume and dimensions of the passage will change, thereby effecting a change in the pressure applied to the transparency. The transparency will travel in response to the changes in pressure until it has reached the point-of-best focus. As distinguished from the prior art, no external adjusting means is needed to actuate the movement of the transparency.

THe invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

In the illustrative embodiment, I have shown the present invention in use with a slide projector. Although the method of device of the present invention for automatically maintaining image focus are most useful with slide projectors, they are also applicable to other types of projection apparatus such as for example motion picture projectors, microfilm projectors, photoenlargers, etc. Because slide projectors are well known, the present description with be directed in particular to elements forming part of, or cooperating more directly with apparatus in accordance with the present invention. It s to be understood that projector elements not specifically shown or described may take various forms well known to those skilled in the art.

Figure 1:
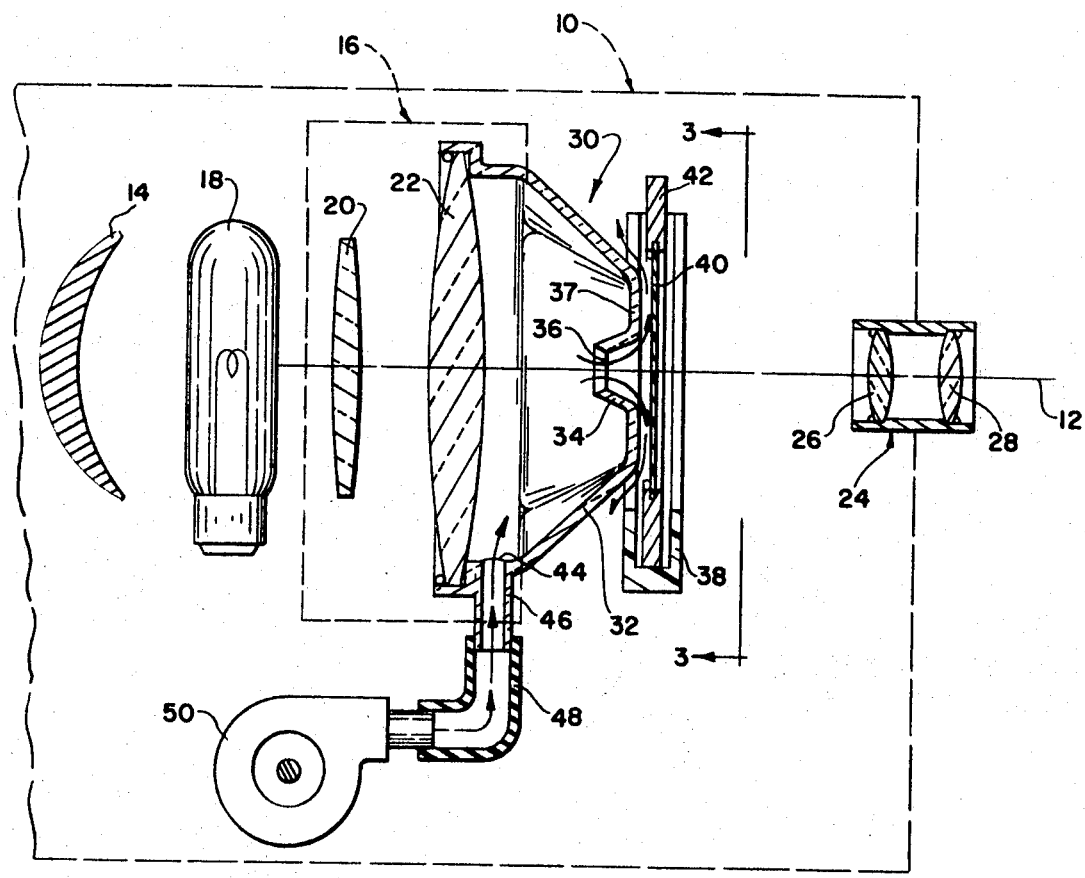
FIG. 1 is a schematic view, partially in section, of a portion of a projector showing the features of the present invention.
Figure 2:
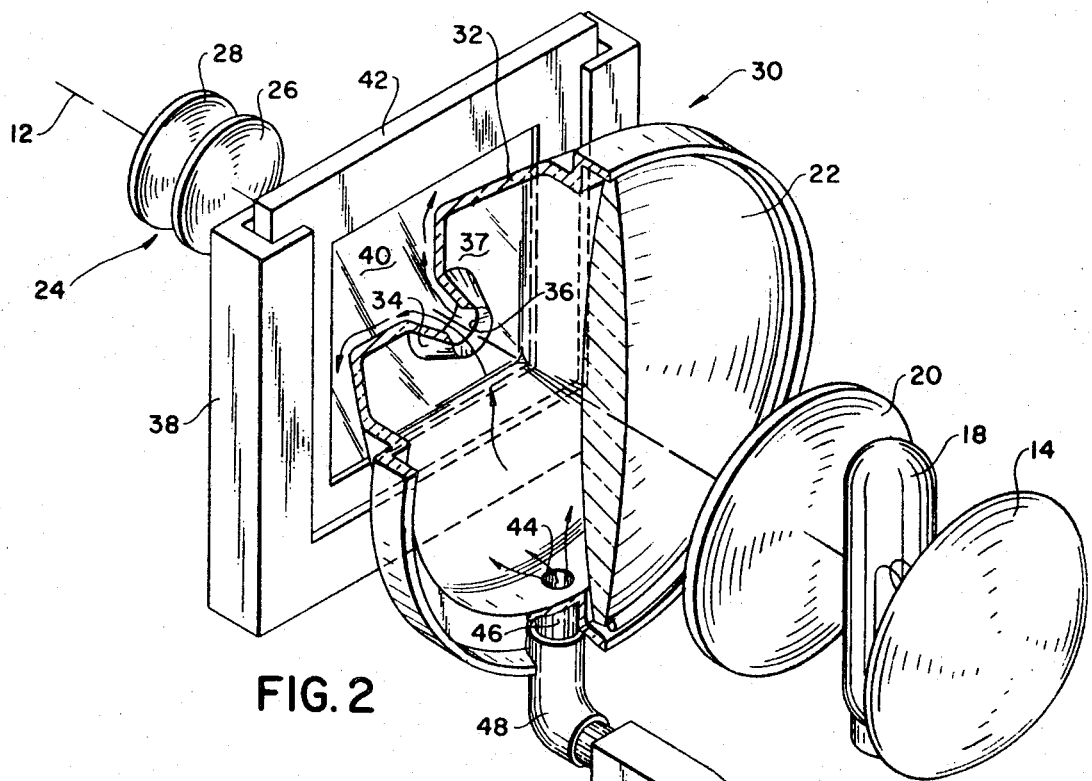
FIG. 2 is another view, partially in cross-section, of the portion of the projector shown in FIG. 1.
Figure 3:
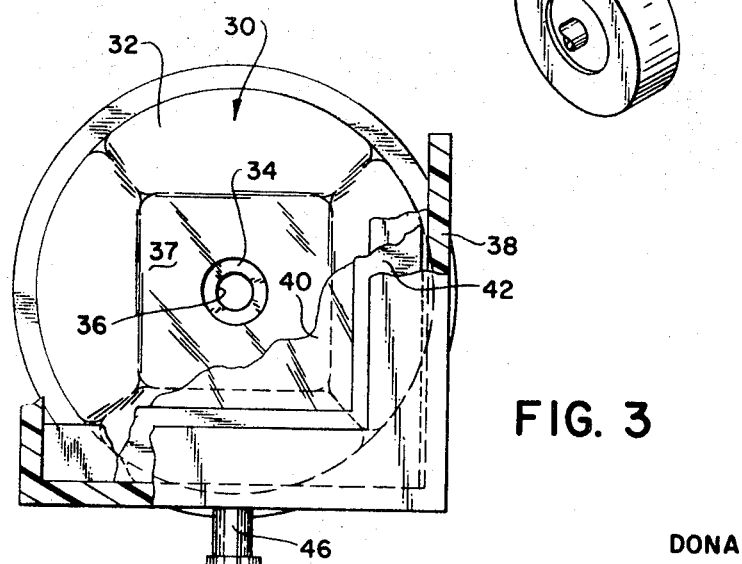
FIG. 3 is a partially broken away view of the projector taken along line 3—3 of FIG. 1.

Referring to FIG. 1, there is shown a portion of a projector 10 having an optical axis 12. The projector contains a light reflector 14 and a condenser lens assembly 16 with a lamp 18 interposed therebetween. As shown, condenser lens assembly 16 may consist of a pair of lens elements 20 and 22.

A projection lens assembly 24 is mounted at the front of projector 10. As shown, projector lens assembly 24 includes lens elements 26 and 28, although other suitable combinations of focusing optics known to those skilled in the art may be used.

Mounted between condenser lens assembly 16 and projector lens assembly 24 is the automatic focusing apparatus of the present invention. Lens 22 forms the rear wall of a plenum chamber 30, the other walls of which are formed of transparent material and includes a side wall 32 and a facewall having a frustro-conical central portion 34 with an opening 36. The facewall further includes a flat, annular portion 37. Opening 36, centered about optical axis 12, forms a passage for the egress of air from plenum 30, and is located a sufficient distance from the depth of field of projector lens assembly 24 so as not to appear in the projected image when normal focal length lenses are used. Immediately forward of the facewall is a generally U-shaped bracket 38 adapted to receive a slide transparency 40 carried in a mount 42. Bracket 38 is formed to permit movement of slide mount 42 along optical axis 12 so that the emulsion sur-face of the slide my be positioned at the point-of-best focus independent of the thickness of mount 42.

Facewall portion 37 and transparency 40, by virtue of their relative shape and position, form an annular restricted passage centered about axis 12. The restricted passage permits radial movement of air, which emerges from opening 36, across transparency 40. Sidewall 32 of plenum chamber 30 has an air inlet opening 44 formed by a nipple 46. A tube or conduit 48 interconnects opening 44 and the outlet of a constant pressure air source 50. Source 50 maintains the pressure in plenum chamber 30 at a level greater than atmospheric pressure. The pressure within plenum chamber 30 is uniformly constant so that the volume of air introduced by source 50, effects a like volume of air to flow out of the chamber through opening 36.

In operation, when a transparency is inserted in bracket 38, the transparency forms a restricted passage with portion 37 of the facewall. As mentioned hereinbefore, the dimension of bracket 38 taken in the direction of optical axis 12 is selected to accommodate all reasonable variations in the thickness of transparency mounts 42, yet the bracket is narrow enough to permit adequate initial focusing of the transparency upon a projector screen located some preselected distance from projector 10. The space between portion 37 of the facewall and transparency 40 permits the movement of air which emerges through opening 36 to move radially outwardly between the facewall and the slide. The pressure against the rear face of transparency 40 will vary as a function of the position of the slide along optical axis 12. In the region of opening 36, the pressure against the transparency will be greater than atmospheric and will decrease in accordance with Bernoulli's Theorem as the velocity of the air in a direc-tion parallel to transparency 40 increases in the region of portion 37 of the facewall. The pressure exerted on the front surface of transparency 40 will always be atmospheric.

When a slide is placed in bracket 38, the slide will move axially in either direction until the forces produced by the pressures on either side of the slide are equal. At that time, lens assembly 24 can be adjusted to focus the projected image on a screen and to define the point-of-best focus as the position of the slide at that time.

It will be understood that the force across a slide will be zero only if the slide is positioned at this exact location. Therefore, if another slide is subsequently inserted in bracket 38 too far to the right of the point-of-best focus, as viewed in FIG. 1, the normally relatively high pressure in the region of opening 36 will be reduced an amount proportional to the distance of the slide from the point-of-best focus. As a result, the force from the atmospheric pressure exerted over the front surface of slide 40 will be greater than the resultant force from the pressures exerted on the rear surface of the slide, causing the slide to travel axially toward the facewall. As slide 40 moves, the annular orifice is reduced causing the pressure within the region between opening 36 and the slide to increase. This increase in pressure is off-set to some extent by a reduction in pressure within the region of the annular surface, but, the build-up in pressure exceeds the rate of reduction in pressure. Hence, the overall pressure on the rear side of transparency 40 increases as the slide travels toward the facewall. When this overall force equals the force from the atmospheric pressure exerted on the forward side of slide 40, the system is in equilibrium and the slide is at the point-of-best focus.

Likewise, should transparency 40 distort due to "popping" so that its information bearing film surface moves toward projector lens assembly 24, the width of the annular orifice increases and the pressure behind the slide is again reduced, causing a force imbalance to occur in favor of the force produced by the atmospheric pressure on the front side of transparency 40. This imbalance will cause the slide to travel to the left until force equilibrium is reached, which will be the point-of-best focus for the slide when distorted.

Conversely, if a slide is initially inserted in bracket 38 too far to the left of the point of best focus, the pressure exerted on the slide due to the reduction in size of the annular orifice will be higher than normal. The pressure in the region of the annular orifice will be less than normal, but this zone of reduced pressure will not be sufficient to offset the increased pressure in the region of opening 36. The net effect is to cause an excess of force acting on the rear side of transparency 40. This excess will cause the slide to travel to the right until the force on both sides of the slide is equal, the point-of-best focus.

Likewise, if transparency 40 should "pop" rearwardly, the orifice is reduced, and, just as when the slide is initially positioned too far to the left, the overall force on the rear of the slide is increased, thereby effecting the forward axial movement of the film towards its "in focus" position.

Aside from the automatic focusing effect of the present invention, the passage of air over the total surface of transparency 40 further serves as a medium by which heat generated by light soucre 18 can be removed from the transparency. Experimental tests conducted have verified that the cooling effect on the film by the air movement is sufficient to negate the need for using heat absorbing glass to protect the film.

The invention has been described in detail with particular reference to a preferred embodiment thereof, but it will be understood that variations and modifications can be effected within the spirit and scope of the invention.

I claim:

1. For use in a projector, a device for locating in a reference position a film transparency having opposed first and second surfaces, said device comprising:
   means for supporting such a film transparency for movement relative to said reference position in a path generally perpendicular to the film transparency surfaces and with the second surface exposed to a reference pressure, said reference pressure producing a resultant force acting on the second surface;
   means for applying a fluid pressure to the first surface, which fluid pressure in cooperation with said reference pressure effects movement of the film transparency along said path, said fluid pressure applying means including means for producing a first pressure having a magnitude greater than said reference pressure and a second pressure having a magnitude less than said reference pressure, said first and said second pressures respectively producing first and second forces acting on the first surface; and
   means for varying the respective magnitudes of said first and said second pressures relative to each other as a function of the position of the supported film transparency along said path so that said first and second forces produce a resultant force acting on the first surface equal to said resultant force acting on the second surface when the film transparency is moved into said reference position.

2. A device as defined in claim 1 wherein said pressure varying means includes means for simultaneously increasing said first force over a first portion of the first surface and for decreasing said second force over a second portion of the first surface upon movement of the film transparency from said reference position in the direction faced by the first surface such that the fluid pressure over the first surface exerts a total force thereon greater than said resultant force exerted over the second surface, whereby the film transparency is moved toward said reference position by the force differential.

3. A device as defined in claim 1 wherein said pressure varying means includes means for simultaneously decreasing said first force over a first portion of the first surface and for increasing said second force over a second portion of the first surface upon movement of the film transparency from said reference position in the direction faced by the second surface of the film transparency such that the fluid pressure over the first surface exerts a total force thereon less than said resultant force exerted on the second surface, whereby the film transparency is moved toward said reference position by the force differential.

4. A device as defined in claim 3 wherein said pressure varying means includes means for directing fluid toward the first portion of the first surface and for causing the fluid to flow radially outward across the second portion of the first surface.

5. For use in a projector, a device for locating in a reference position a film transparency having opposed first and second surfaces, said device comprising:
   means for supporting such a transparency for movement relative to said reference position in a path generally perpendicular to the film transparency surfaces and with the second surface exposed to air at atmospheric pressure;
   means cooperable with the first surface of the transparency for defining an air chamber to subject the first surface to the influence of a variable air pressure, said chamber having a first portion positioned to receive air under pressure greater than atmospheric and a second portion communicating with said first portion and positioned to receive air flowing out of said first chamber portion, said second chamber portion being shaped to cause such air flowing out of said first chamber portion to increase in speed such that the air pressure in said second chamber portion will be below atmospheric while the air pressure in said first chamber portion is above atmospheric; and
   means for applying air to said first chamber portion under a pressure such that the resultant force of the pressures in said first and second chamber portions against the first surface is equal to the resultant force of the atmospheric pressure against the second surface when the transparency is in the reference position and such that a differential resultant force exists urging the transparency toward the reference position when the transparency is away from the reference position.

6. For use in a projector having an optical axis, means for directing a beam of light along the optical axis, and projecting means for projecting such light onto a viewing surface, a device for locating in a reference position along the optical axis an image bearing transparency having first and second surfaces, said device comprising:
   means for mounting the transparency to extend across a given cross-section of the light beam such that the light appearing within said given cross-section projects the image thereon through said projecting means onto the viewing surface, said transparency mounting means further including means for supporting such a film transparency to permit movement relative to said reference position along the optical axis with the second surface exposed to atmospheric pressure;
   a transparent member having an aperture located about said optical axis, said transparent member extending across said given cross-section of said projected light beam and being spaced along the optical axis relative to said transparency mounting means such that said transparent member is out of the depth of field of said projecting means;
   a source of fluid under pressure;
   means for directing fluid from said source through said aperture of said transparent member toward the first surface of the supported film transparency to create a first pressure, having a magnitude greater than atmospheric pressure, acting against a first portion of the first surface; and
   means for directing at least a portion of the fluid acting against the first portion of the first surface between said transparent member and a second portion of the first surface of the transparency to create a second pressure, having a magnitude less than atmospheric pressure, acting against the second portion of the first surface, whereby the resultant of said first and said second pressures produce a force equal to the force produced by said atmospheric pressure acting on the second surface when the film transparency is positioned at said reference position.

7. For use in a projector having an optical axis, means for projecting a beam of light along the optical axis, and projecting means for projecting such light onto a viewing surface, a device for locating in a reference position along the optical axis an image bearing transparency having first and second surfaces, said device comprising:

means for mounting the transparency to extend across at least a given portion of the light beam such that light defining said given portion of the beam causes the image on the transparency to be projected onto the viewing surface, said transparency mounting means further including means for supporting such a film transparency for movement in either direction along the optical axis relative to the reference position with the second surface exposed to atmospheric pressure;

a transparent wall spaced along the optical axis from said reference position, said wall having (1) a first area defining with a first portion of the supported transparency a first chamber portion and (2) a second area radially outwardly from said first area defining with a second portion of the supported transparency a second chamber portion surrounding, contiguous with and open to said first chamber portion, said transparent wall extending across said given portion of the light beam and being spaced along the optical axis relative to said transparency mounting means such that said transparent wall is out of the depth of field of said projecting means;

means for admitting fluid under pressure into said first chamber portion, said fluid admitting means including means for creating within said first chamber portion a pressure having a magnitude greater than atmospheric pressure and for creating within said second chamber portion a pressure having a magnitude less than atmospheric pressure, said pressure in said first chamber portion producing a first force acting on the first portion of the transparency and said pressure in said second chamber portion producing a second force acting on the second portion of the transparency, the magnitudes of said first and second forces being related to the position of the transparency relative to the reference position whereby the resultant of said forces moves the transparency to the reference position.

8. A device as defined in claim 7 wherein said means for admitting fluid into said first chamber portion comprises:

an opening defined by said wall in said first area; a source of fluid under pressure; and means interconnecting said opening to said source.

9. For use in a projector having an optical axis, a device for locating in a reference position along an optical axis a film transparency having first and second surfaces, said device comprising:

means for supporting such a film transparency for movement in either direction relative to said reference position along the optical axis with the second surface exposed to atmospheric pressure;

a transparent wall spaced from said transparency supporting means so as to define a passage between said wall and the first surface of the transparency, said wall having a first portion in the shape of a hollow frustum opening toward the transparency and a second portion contiguous with and surrounding said first portion;

a source of fluid pressure; and means for directing fluid from said source into said passage so as to create two individually distinct zones of pressure therein consisting of a zone of relatively high pressure having a magnitude greater than atmospheric pressure between said first portion of said wall and the transparency and a zone of relatively low pressure having a magnitude less than atmospheric pressure between said second portion and the transparency.

* * * * *